UNITED STATES PATENT OFFICE.

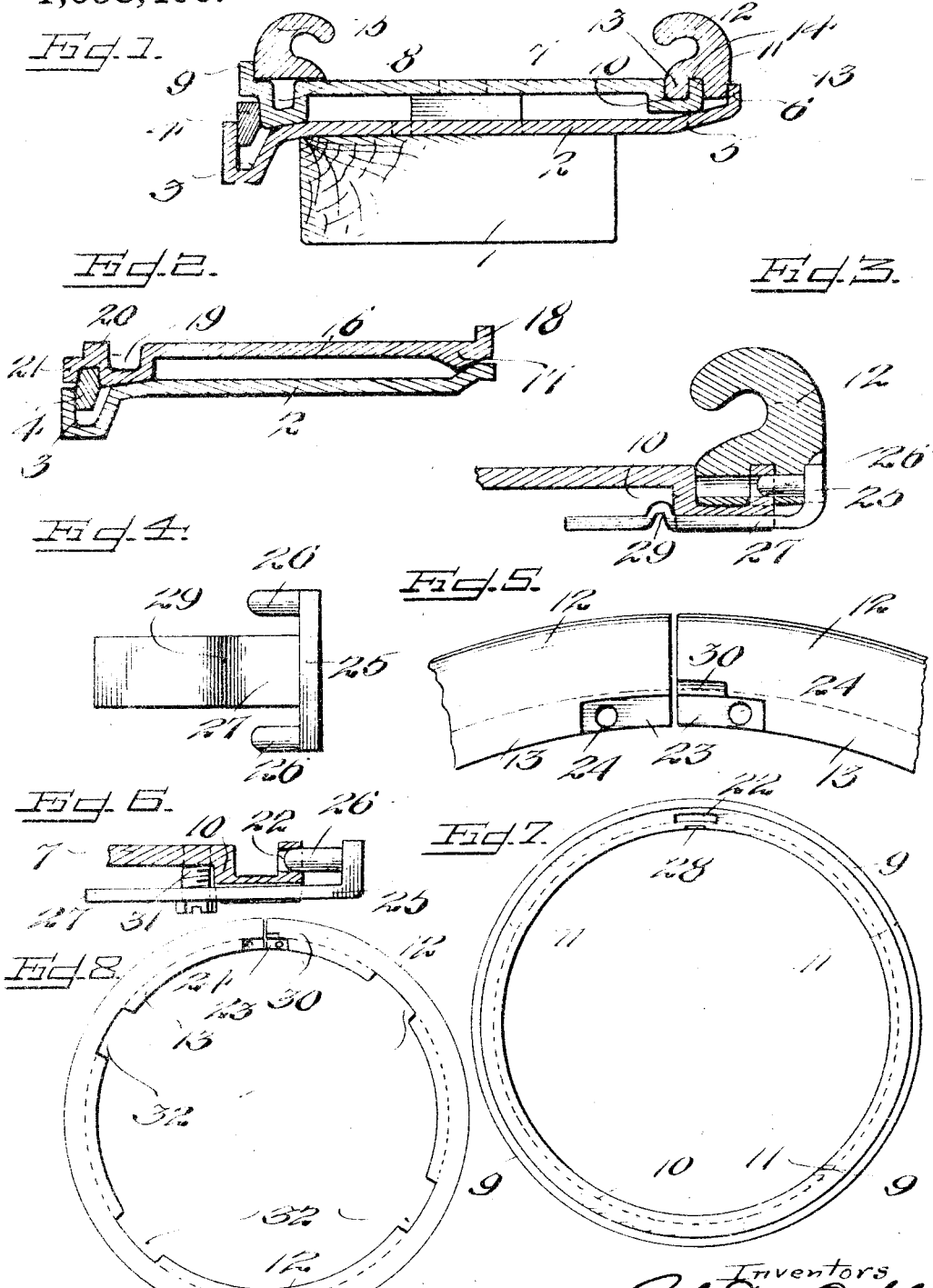

ROBERT W. ASHLEY AND FRANK OBERKIRCH, OF NEW YORK, N. Y., ASSIGNORS TO GENERAL RIM COMPANY, A CORPORATION OF NEW YORK.

DEMOUNTABLE RIM.

1,058,400.  Specification of Letters Patent.   Patented Apr. 8, 1913.

Application filed September 21, 1912. Serial No. 721,708.

*To all whom it may concern:*

Be it known that we, ROBERT W. ASHLEY and FRANK OBERKIRCH, citizens of the United States, and residents of New York city, in the county of New York and State of New York, have invented certain new and useful Improvements in Demountable Rims, of which the following is a specification.

The invention relates to improvements in demountable rims for motor vehicle wheels and has particular reference to a device for locking the separable tire retaining rings of said rim to the demountable base rim.

The object of the invention is the providing of means adapted to lock the split ends of a separable tire retaining ring to the base supporting rim of a demountable rim, obviating the necessity of demounting the rim from the fixed felly rim thereby permitting the interchanging of a pneumatic shoe and tube without the removal of the supporting factors of said demountable rim.

In the following is described in connection with the accompanying drawings one embodiment of the invention the features thereof being more particularly pointed out hereinafter in the claims.

In the drawings Figure 1 is a cross sectional view of one form of demountable rim; Fig. 2 is a cross sectional view of a modified form of demountable rim; Fig. 3 is an enlarged detailed sectional view of the front edge of the demountable rim illustrating in connection therewith the position of the separable ring thereon, having associated therewith the locking means for locking said separable ring to the base member of said demountable rim; Fig. 4 is a plan view of the locking clip; Fig. 5 is a detailed face elevation of the split ends of the separable tire retaining ring; Fig. 6 is a modified form of locking clip; Fig. 7 is a face elevation of the base rim; and Fig. 8 is a modified form or type of separable tire retaining ring.

Similar numerals of reference indicate similar parts throughout the several views.

In the drawings (1) designates a felly having rigidly mounted thereon a fixed annular rim (2) provided at its front edge with an annular groove (3) carrying a demountable rim locking means (4), said fixed rim (2) having formed on its rear edge a tapered bearing surface (5) and a retaining shoulder (6).

(7) indicates the base member of the demountable rim and has formed therein at its outer edge a depending channel (8) and a retaining shoulder (9) the under surface of depending channel (8) being so formed as to rest upon the supporting surface of fixed rim (2) at a point adjacent to annular groove (3). The base member of demountable rim (7) has formed at its rear edge a channel (10) and a wall (11) the under surface of channel (10) resting upon the supporting surface (5) of fixed rim (2).

(12) indicates a separable tire retaining ring provided with two depending flanges (13) forming between said flanges a groove (14) adapted to receive the wall (11) of demountable rim (7). One of the flanges (13) of ring (12) overlaps wall (11) and when assembled engages retaining shoulder (6) on fixed rim (2).

A tire retaining ring (15) spans channel (8) and engages retaining shoulder (9) on the front edge of said rim (7).

Referring to Fig. 2 of the drawings the fixed annular rim (2) is similar to that as above described, and has mounted thereon a demountable rim (16) provided at its rear edge with a reinforcing flange (17), and a retaining shoulder (18) and at its front edge with a depending channel (19) the lower surface of which rests on the upper surface of fixed rim (2) and immediately adjacent to said depending channel (19) an upwardly projecting annular rib (20) and on its extreme outer edge an overlapping flange (21) forming above said annular groove (3) a housing for the demountable locking means (4). The wall (11) of the base member of demountable rim (7) has cut therein an elongated slot (22) and the split ends of ring (12) have formed in the flanges (13) an aperture (23) and holes (24) adapted to receive a spring clip locking cleat (25) provided with laterally projecting pins (26) adapted to engage said holes (24) in ring (12) and a laterally projecting base (27) resting in a slot (28) on the under surface of channel (10). Said base (27) has formed therein a cam or spring hump (29) adapted to spring beneath or behind the inner surface shoulder of said depending channel (10) the laterally projecting base (27) forming throughout its entirety a spring clip retaining means. One of the split ends of ring (12) may have cut therein an aperture (30) to permit of the insertion therein of a tool in the form of nippers to withdraw said cleat from its engagement with both ends of said ring (12), obviating in this instance the necessity of demounting the rim from the wheel.

Referring to Fig. 6 of the drawings the locking cleat (25) may have mounted therein a set screw (31) to act as a means of locking the same to the base member of rim (7).

With reference to Fig. 8 of the drawings the flanges (13) of ring (12) may have cut therein a plurality of openings (32) to permit of the insertion thereunder of a suitable tool to separate said ring (12) from the depending channel (10) in the base member (7) of the demountable rim.

It is obvious that the device herein shown and described may be widely varied in many of its structural features without departing from the spirit of the invention.

What we claim and desire to secure by Letters Patent of the United States is—

1. A device of the character described comprising a demountable rim provided at one edge with a depending channel and retaining shoulder and at its opposite edge with a depending channel and a retaining wall, a separable tire retaining ring provided with two depending flanges one of said flanges engaging said last mentioned channel and the other of said flanges engaging the outer surface of said retaining wall, and a locking cleat mounted in said ring and engaging said retaining wall and depending channel.

2. A device of the character described comprising a demountable rim base member provided at one edge with a depending channel and an upwardly projecting annular rib and an overlapping edge and at its opposite edge with a reinforcing flange and a retaining shoulder, a tire retaining ring mounted on said base member and engaging said retaining shoulder, a split tire retaining ring provided with two depending flanges adapted to engage said upwardly projecting annular rib one of said flanges engaging said channel and the other of said flanges engaging said overlapping edge, and a locking cleat mounted in said split ring engaging said upwardly projecting annular rib and said depending channel.

3. A device of the character described including a tire retaining ring provided with two depending flanges, apertures cut in the split ends of said ring, a demountable supporting base rim, a channel formed at the edge of said base member, a retaining wall associated with said channel, a slot cut in said retaining wall, and a cleat mounted in the ends of said split ring provided with pins engaging the apertures therein and a base having formed therein a cam locking lug adapted to engage the under surface of said channel.

4. A device of the character described including a locking cleat for split separable rings for demountable rims comprising a supporting member having formed thereon pins and a laterally projecting base having formed therein a spring locking lug.

In testimony whereof we have hereto signed our names in the presence of two subscribing witnesses.

ROBERT W. ASHLEY.
FRANK OBERKIRCH.

Witnesses:
E. E. HAINES,
CHARLES C. LINK.